Figure 1:
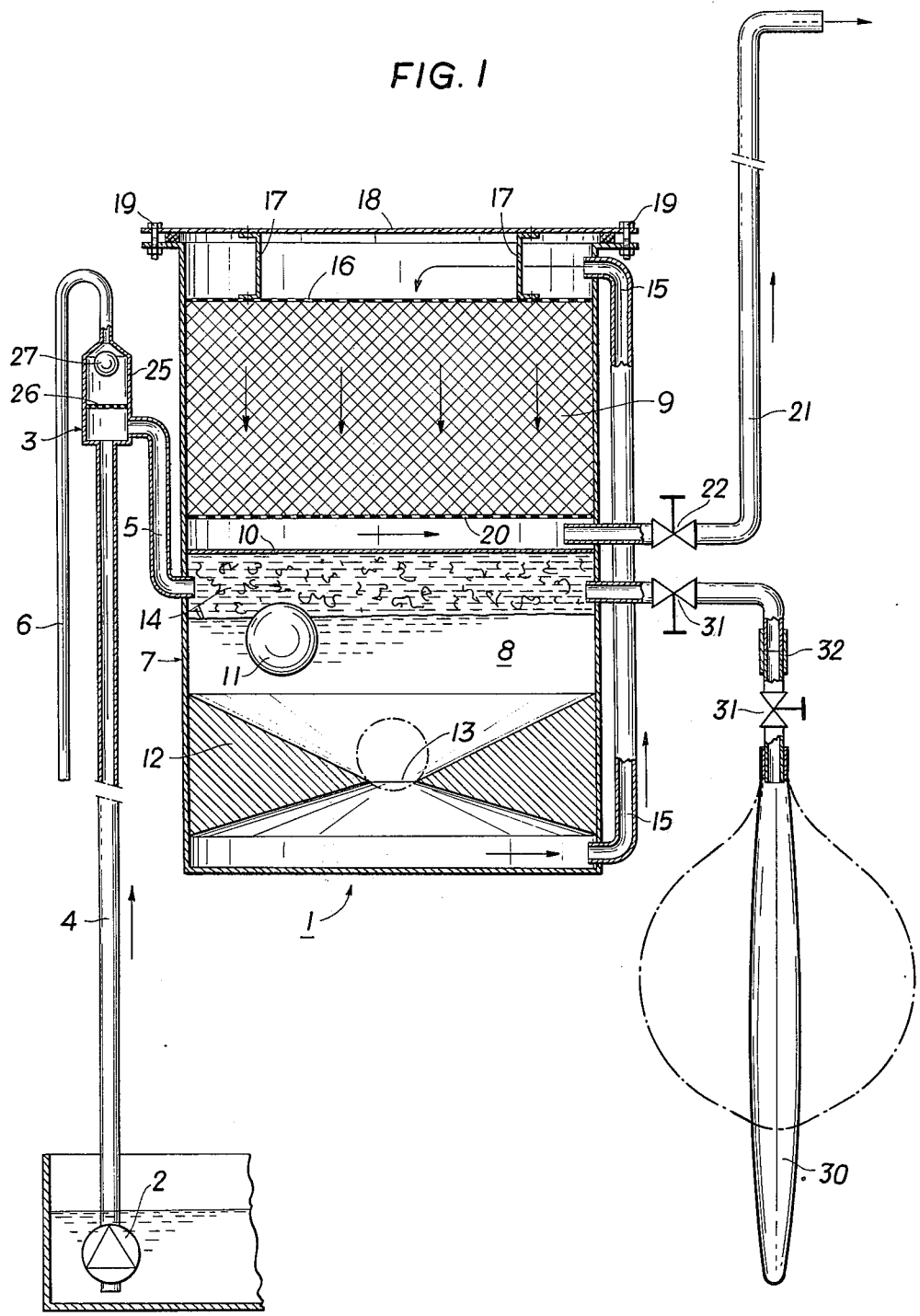

United States Patent [19]

Jakubek et al.

[11] 3,957,641

[45] May 18, 1976

[54] DEVICE FOR SEPARATING LIQUIDS OF SPECIFICALLY LOWER DENSITY THAN WATER, AND PARTICULARLY OIL, FROM WATER

[75] Inventors: Peter Jakubek, Brunn am Gebirge; Karl Biswanger, Vienna, both of Austria

[73] Assignee: Fa. Euro Pollution Control Systems, Inc., Luxemburg, Luxemburg

[22] Filed: May 14, 1974

[21] Appl. No.: 469,894

[30] Foreign Application Priority Data
May 16, 1973 Austria .............................. 4285/73

[52] U.S. Cl. ........................... 210/120; 210/DIG. 5; 210/124; 210/262
[51] Int. Cl.² ........................................ B01D 35/00
[58] Field of Search ............ 210/115, 117, 124, 97, 210/104, 120, 130, 242, 513, 532, 533, 472, DIG. 5, DIG. 21, 23, 262

[56] References Cited
UNITED STATES PATENTS

| 812,831 | 2/1906 | Davidson | 210/120 X |
|---|---|---|---|
| 1,681,980 | 8/1928 | Gross | 210/120 X |
| 1,948,543 | 2/1934 | Samiran | 210/115 |
| 2,047,229 | 7/1936 | Samiran | 210/117 |
| 2,115,043 | 4/1938 | Samiran | 210/124 |
| 2,740,492 | 4/1956 | Williams | 210/120 |
| 3,558,482 | 1/1971 | De Young | 210/23 |
| 3,796,656 | 3/1974 | Avey | 210/DIG. 21 |

Primary Examiner—Theodore A. Granger
Attorney, Agent, or Firm—Ernest G. Montague; Karl F. Ross; Herbert Dubno

[57] ABSTRACT

A device for separating liquids of lower density than water, in particular oil, from water, comprises a pump and a separator receiving the liquids from the pump. The separator comprises a settling chamber and a filter pack arranged behind the latter. A line between the pump and the settling chamber feeds the liquids exclusively to the latter. The line includes a vent valve. An overflow opening device is provided between the settling chamber and the filter pack. A shut-off member is provided for closing the overflow opening in response to the thickness of the layer of liquid of lower density collected in the settling chamber.

6 Claims, 3 Drawing Figures

U.S. Patent  May 18, 1976  Sheet 1 of 2  3,957,641

DEVICE FOR SEPARATING LIQUIDS OF SPECIFICALLY LOWER DENSITY THAN WATER, AND PARTICULARLY OIL, FROM WATER

The present invention relates to a device for separating liquid of lower density than water, particularly oil, from water. The device has a pump for pumping the liquid to a separator which consists of a settling chamber and a filter pack arranged below it.

To protect the environment, there has been an increased need for devices to separate water from oil. In particular, the contamination of coastal and inland waters by dirty water which is pumped overboard by sports boats or pleasure boats and generally contains a large amount of oil has increased sharply in recent years. Vessels have a bilge in which water of condensation, wash water, rain water and spray water from leaky points collect. However, oil, grease and the like also pass into the bilge, for instance from leaks in the engine in the case of inboard engines, or by the spilling of oil upon a change in oil. Upon the pumping out of the bilge, the oil is cast overboard together with the dirty water and leads to considerable contamination, particularly in ports.

For larger ships, elaborately developed de-oiling devices already exist. However, they require considerable maintenance, and the water from which the oil has been removed achieves only under favorable conditions the prescribed degree of purity of 20 mg oil per liter of water for inland waters and 100 mg/l water at sea.

A device disclosed in British Patent No. 1,193,755 is also primarily intended for separating oil from the rinse or ballast water of oil tankers, where very large amounts of liquid accumulate.

The object of the present invention is to provide a device, which is as simple and robust as possible, by means of which the quantities of liquid accumulated in the bilges of sport boats and ocean-going yachts can be handled. The device is intended to make an effective pumping out of bilges possible and to reliably prevent water which has been contaminated with oil or the like from being pumped overboard. Also the device should be capable of automatic operation without requiring complicated electric control means.

These object are achieved in accordance with the present invention in that a vent valve is provided in the line between the liquid pump and the settling chamber, and in that an overflow opening is provided between the settling chamber and the filter pack, said overflow opening being opened and closed as a function of the thickness of the layer of the liquid of lower density which collects in the settling chamber.

By the use of a pump which conveys exclusively liquids and thus no air, for instance a centrifugal pump, air taken from the bilge is prevented from being pumped into the separator without requiring further control means. The vent valve provides assurance that after the disconnecting of the pump, the line from the pump can be emptied and the separator cannot run dry, and ensures that, upon an increase of the level of liquid in the bilge, liquid will penetrate into the pump, as is essential, since the pump is not self-priming. Finally, the air can escape from the line via the vent valve so that no air passes into the separator proper.

Further features of the invention will be explained now in further detail with reference to the drawing which diagrammatically shows several illustrative embodiments.

Figure 2:
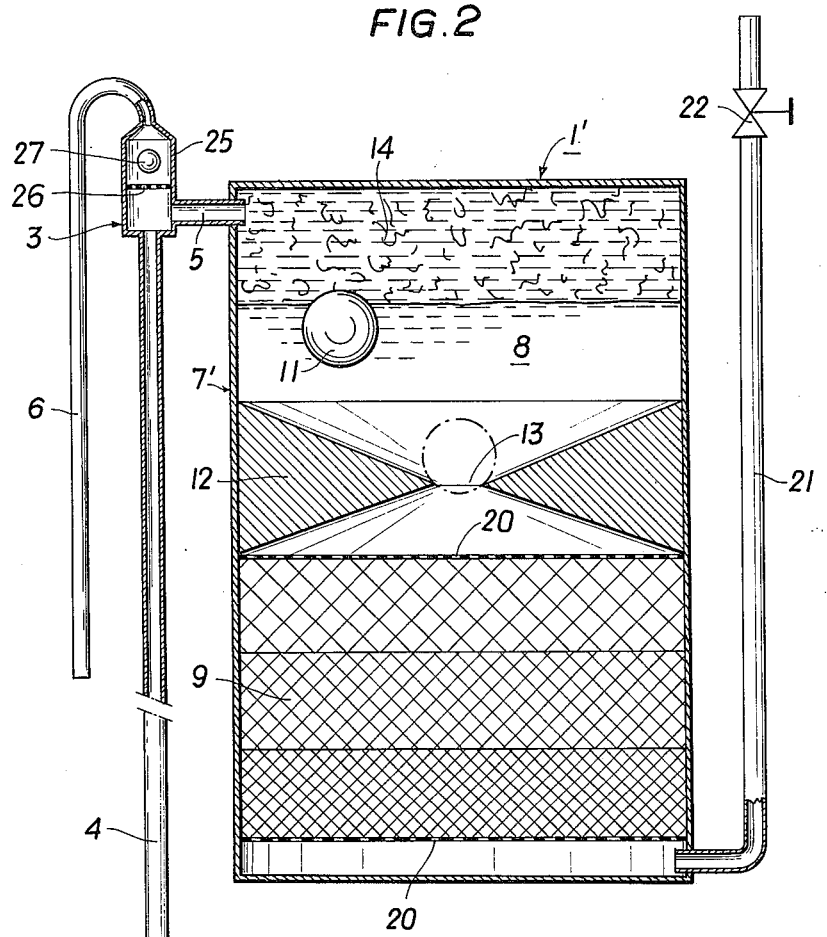
Figure 3:
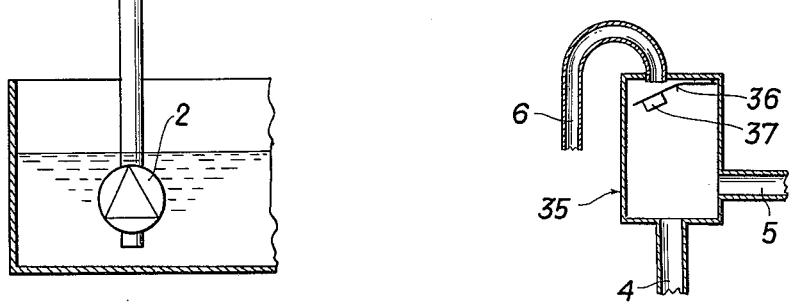

In the drawing:

FIG. 1 is a vertical section of a first embodiment of a separator according to the invention, FIG. 2 is a similar view of a second simplified embodiment, and FIG. 3 shows a vent valve in section.

In the separator 1 shown in FIG. 1, a centrifugal pump 2, which is arranged in the bilge of a water-going vessel, pumps contaminated water to the separator 1 through a line 4, 5. As possible impurities there are to be considered not only oil and grease, but also solid impurities which are suspended in water in the bilge.

Between the two branches 4 and 5 of the line, there is arranged a vent valve 3. The branch 5 empties into a settling chamber 8 arranged at the bottom in the housing 7 of the separator 1. A first coarse separation between water and portions of lower density takes place in the settling chamber 8. The roughly purified water flows via an overflow opening 13 and a line 15 which extends upward along the outside of the housing 7 into a filter chamber with filter 9 arranged above the settling chamber 8. The filter 9 rests on a perforated plate 20 and is held down from above by a perforated plate 16. The perforated plate 16 is connected via connecting bars 17 with the cover 18 of the housing 7. The cover 18 is connected with the bottom of the housng 7 by screws 19. The water which is purified after passage through the filter pack 9 flows via a discharge line 21 containing a shutoff valve 22, out of the separator 1. The filter chamber is separated from the settling chamber 8 by a partition 10.

In the case of the embodiment shown in FIG. 1, the line 4, 5 coming from the pump extends upward to approximately half the height of the filter 9. The vent valve is located at the highest point of this line 4, 5. When the device is not operating, the settling chamber 8 and the filter chamber are therefore entirely filled with liquid. Liquid will rise as high in the discharge line 21 as corresponds to the highest point of the line 4, 5. The vent valve 3 comprises a housing 25 which is subdivided into two spaces by a grid 26. The line 4 coming from the pump 2 discharges into the lower space, and the line 5 leads to the settling chamber 8. Within the upper space of the vent valve 3 there is a valve ball 27 which lies on the grid 26 when the apparatus is not operating. The valve ball 27 is of such density that it floats on water.

Since the line 4, 5 is vented, when dirty water accumulates in the bilge, this water can also penetrate into the pump chamber of the pump 2, so that after the pump has been placed in operation, which can be effected either manually or automatically by means of a float valve, this dirty water is pumped up into the line 4. The upward-flowing dirty water displaces the air from the line 4, and the air discharges through the vent valve 3 and the vent line 6. The rising water will lift the float ball 27 in the housing 25 of the vent valve 3 until the ball closes the mouth of the vent line 6. The dirty water then continues to flow via the line 5 into the settling chamber 8. A part of the impurities which are of lower density than water will collect in a layer 14. The water itself and the rest of the impurities will flow through the overflow opening 13 in the wall 12 and via the connecting line 15 into the filter chamber and, after passage through the filter 9, it discharges from the apparatus via the line 21 as cleaned water. Solids are retained in the filter 9 in addition to the rest of the liquid impurites which are of lower density than water.

If the bilge is now empty, the centrifugal pump 2 runs empty, since it cannot pump air. After the disconnecting of the pump and the drop of pressure in the line 4, 5, the vent valve 3 will open so that the running out or siphoning out of the separator 1 via the lines 4, 5 is prevented. Merely the water present in the discharge line 21 will flow back until reaching in the discharge line 21 a level of liquid which corresponds to the highest point of the line 4, 5. Furthermore, the water contained in the line 4 will flow back into the bilge 2. In this way assurance is had that the separator 1 will always be filled with liquid, which, as it has been found, is extremely desirable for an effective and good removal of the impurities, particularly in the filter 9. The layer 14 which collects in the settling chamber and consists essentially of oil will gradually increase in thickness. At the same time, a densimetric ball 11 which is of such weight that it floats in the boundary region between the layer 14 and the roughly purified water approaches the wall 12 bearing the overflow opening 13 until it finally closes the overflow opening 13 and interrupts the further conveying of contaiminated water into the separator 1. The reliable closing of the overflow opening 13 by the ball 11 is assured on the one hand by the fact that the wall 12 is of a funnel shape, at least on the side thereof facing the layer 14, and on the other hand by the fact that the ball 11 is pressed firmly by the liquid pressure against the edges of the overflow opening 13. In this way an excessive amount of oil is dependably prevented from entering into the filter pack 9 and exhausting the latter within a short time.

If, in the embodiment of FIG. 1, a layer 14 of greater thickness has accumulated in the settling chamber, it is possible to remove it from the settling chamber 8. For this purpose the valve 22 provided in the discharge line 21 is closed and valves 31, via which a bag 30 for the receiving of impurities which have been removed is connected to the housing 7 in the region of the settling chamber 8, is opened. The pump 2 is placed in operation, whereupon the layer 14 is forced by the water behind it out of the settling chamber 8 and into the bag 30. After the bag 30, which can be folded together before it is filled with oil, has become full, the shutoff members 31 are closed and the filled bag 30 is removed. The removal of the bag 30 is facilitated by the provision of a connecting point 32 which is prepared for the separation or an easily opened coupling member. After the withdrawal of oil from the settling chamber 8 has been completed, the valve 22 is opened again and normal operation can continue.

When the filter pack 9 has become exhausted or clogged, it can be removed from the separator 1 after the opening of the cover 18 and either be cleaned or be replaced by a new filter pack. The increase of the layer 14 in the settling chamber 8, as well as the downwardly progressing contamination of the filter 9, can easily be observed if the housing 7 is made at least in part of transparent or translucent material.

The embodiment of the device of the invention which has been described above is particularly suitable for the cleaning of water which is contaminated by considerable quantities of liquids which are of lower density than water. On the other hand, the separator 1' shown in FIG. 2 is intended primarily for cases in which very little oil is obtained and there is scarcely any danger of the filter becoming shifted. In this embodiment the housing 7' is firmly closed and the settling chamber 8 is arranged above the filter pack 9. Between the settling chamber 8 and the filter chamber, there is provided — as in the other embodiment — the partition 12 at the middle of which there is the overflow opening 13 which can be closed by the ball 11. The other parts, such as pump 2, vent valve 3, feedlines 4 and 5 and discharge line 21, correspond to the embodiment of FIG. 1. The manner of operation also agrees with that of the embodiment discussed with reference to FIG. 1. When the layer 14 in the settling chamber 8 has increased to such an extent that the overflow opening 13 is closed by the ball 11, or when the filter 9 is exhausted, the entire housing 7' together with its inserts is simply replaced in the case of this embodiment.

Instead of the vent valve 3 with valve ball 27 which has been shown in FIGS. 1 and 2, there can also be provided a vent valve 35 which is developed in the manner of a flutter valve. The lines 4 and 5 as well as the vent line 6 open into the housing of the vent valve 35. The mouth of the vent line 6 can be closed by a spring flap 36. The flap 36 is acted on by a lead weight 37 or the like in opening direction, so that the vent valve 35 is open as long as the flap 36 is not pressed into its closed position by the contaminated water pumped to the separator 1 or 1'. The operation of the vent valve 35 otherwise corresponds to the operation of the vent valve 3.

The filter used in the invention consists preferably of an oil-resistant, open-pore plastic foam, for instance having a base of polyesters and polyethers crosslinked with isocyanates, diamines or glycols, of polyurethanes, of polyisocyanates or similar filters, in which the size of the pore becomes smaller with increasing depth of filter in the direction of flow, has proven particularly advantageous. Such a graded pore size can be obtained in simple manner by arranging several filter layers, for instance three, which have a different porosity one above the other, in the manner shown in FIG. 2.

We claim:

1. A device for separating a low-density liquid from a high-density liquid in an accumulation of the liquids with filterable contaminents, said device comprising:
    a housing forming a settling chamber for receiving the liquids from said accumulation and allowing separation of said liquids into an upper low-density liquid layer and a lower high-density liquid layer;
    a liquid-displacement pump disposed wholly below said chamber and having an inlet side communicating with said accumulation, and an outlet side;
    an upwardly extending conduit outside said housing connecting said outlet side of said pump with the top of said chamber for delivering liquids from said accumulation thereto upon operation of said pump;
    a vent valve outside said housing connected to said conduit at the uppermost portion thereof and having a gas outlet opening outside said housing, and a liquid-displaceable element for blocking said outlet only upon a rise of liquid in said conduit to said uppermost portion, said element being gravitationally biased away from said gas outlet in the absence of such liquid rise;
    a downwardly converging partition extending across said housing defining a funnel-shaped outlet formed at the bottom of said chamber in said housing;

a blocking member dimensioned to float at the interface between the liquids in said chamber and receivable in said funnel-shaped outlet to close the same;

a filter compartment in said housing communicating with said funnel-shaped outlet and having a filter mass in said filter compartment; and a discharge conduit leading from said filter compartment and extending upwardly to a level at least equal to that of said uppermost portion for discharging the high-density liquid after filtering same through said mass.

2. The device defined in claim 1 wherein said filter compartment is disposed above said settling chamber in said housing, a further upwardly extending conduit running from said outlet to the top of said filter compartment, said discharge conduit opening into said housing below said filter mass and above said settling chamber.

3. The device defined in claim 1 wherein said filter compartment is located directly below said settling chamber in said housing.

4. The device defined in claim 1 wherein said element is a float.

5. The device defined in claim 1 wherein said element is a flap.

6. The device defined in claim 1, further comprising means for discharging liquid from said upper layer and including a pair of valves for enabling the attachment of detachable bags to the last-mentioned means.

* * * * *